April 16, 1946.  A. VLCEK, JR  2,398,605
HARDNESS CERTIFYING MACHINE
Filed Oct. 8, 1943  2 Sheets-Sheet 1
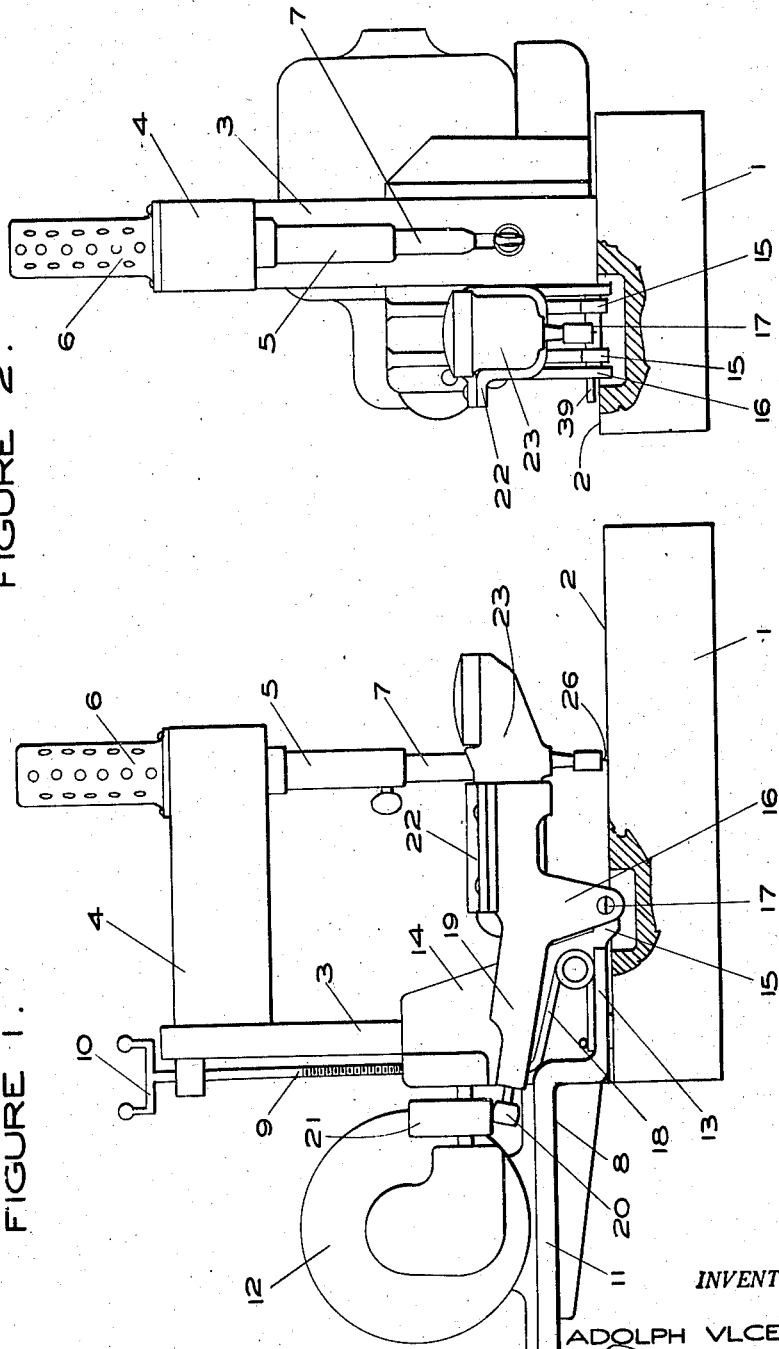
INVENTOR.
ADOLPH VLCEK JR.
BY *George Douglas Jones*
ATTORNEY April 16, 1946.   A. VLCEK, JR   2,398,605
HARDNESS CERTIFYING MACHINE
Filed Oct. 8, 1943   2 Sheets-Sheet 2

INVENTOR.
ADOLPH VLCEK JR.
BY
George Douglas Jones.
ATTORNEY

Patented Apr. 16, 1946

2,398,605

UNITED STATES PATENT OFFICE 2,398,605

HARDNESS CERTIFYING MACHINE

Adolph Vlcek, Jr., Essex, Md., assignor to The Glenn L. Martin Company, Middle River, Md., a corporation of Maryland Application October 8, 1943, Serial No. 505,475

6 Claims. (Cl. 73—81)

This invention relates to a machine for testing the hardness of a material and automatically certifying those samples of material that meet a predetermined minimum hardness requirement.

This type of machine is particularly useful in the aircraft or any similar industry where tremendous quantities of sheet aluminum and other metals of various thicknesses are used, and each sheet must be inspected to see that it has been heat-treated to the proper hardness and stamped with the approval stamp of the inspector before it can be used.

The principal object of the present invention is to reduce the time required to test and certify materials that meet a predetermined minimum requirement of hardness.

Another object of this invention is to reduce the possibilities of an inspector certifying the material that is not of the proper hardness.

Further and other objects will become apparent from the description of the accompanying drawings which form a part of this disclosure and in which like numerals refer to like parts.

In the drawings:

Figure 1 is a side elevational view partly in section of the invention.

Figure 2 is a front view of the same.

Figure 3:
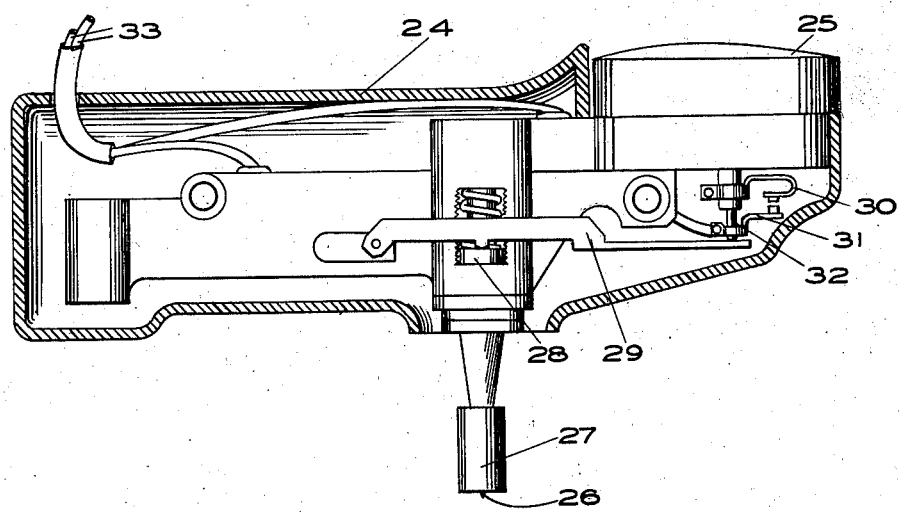
Figure 3 is a sectional view through the testing device.

Figures 1 and 2 illustrate the general arrangement of parts for carrying out this invention. A base member 1 has a flat top 2 affording a working surface, upon which sheets of material are placed for inspection. Upright support member 3 is rigidly secured to the base. Arm 4 is supported by member 3, which in turn affords a mount for the certifying or approval stamp mechanism consisting of plunger 5 and operating solenoid 6. Removably secured in plunger 5 is the personal inspection stamp 7 that certifies the material and identifies the inspector. Also supported on member 3 is a bracket generally indicated as 8. This bracket is adapted to be moved toward and away from working surface 2 by sliding on member 3, by screw 9 and crank 10. On the overhanging portion 11 of bracket 8, a motor 12 is mounted. On portion 13, of bracket 8, is mounted a block 14 which carries bearing members 15. These bearings support lever 16 on pin 17. Spring 18 urges portion 19 of the lever upwardly to hold follower 20 firmly against eccentric 21 and press indenter point 26 into the material being tested. Lever 16 is formed as shown at 22 to clamp a hardness testing unit 23 shown in more detail in Figure 3.

The hardness testing unit shown in Figure 3 consists of a housing or casing 24 having an indicator dial mechanism 25 mounted therein. The hardness testing mechanism is of a conventional form generally comprising a hardness tester, indenter point 26 surrounded by a guard 27. As point 26 moves upwardly relative to the guard, it moves member 28 which in turn moves lever 29. Contact 30 is generally secured to the indicator structure. Contact 31 is secured to pin 32 which is moved upwardly by lever 29 to give an indication of the hardness of the material on dial 25. Wires 33 are connected to contacts 30 and 31 and form a part of the electrical circuit.

Figure 4:
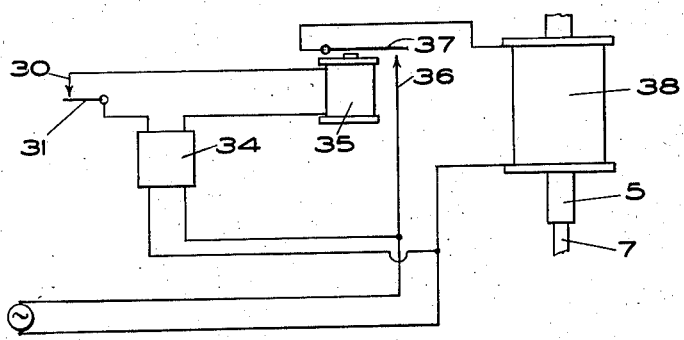
Figure 4 is an electrical circuit diagram of the machine.

The electric circuit shown in detail in Figure 4 consists of a transformer 34 connected to a source of power. Relay 35 is operated by closing switch contacts 30 and 31 to close contacts 36 and 37 to energize solenoid coil 38 which in turn causes plunger 5 carrying stamp 7 to move downwardly and mark the material upon the closing of contacts 30 and 31.

In using the hardness tester, it is important that the indenter point 26 be perpendicular to the material, as it contacts the material for a true indication of hardness. Since, in the inspection of sheet stock, many different thicknesses will be encountered, it is necessary to make provisions for maintaining and checking to be sure that the indenter point 26 is perpendicular to the material under test. To accomplish this, pin 17 has extension 39, forming a heighth gauge, the bottom face of which is formed by a horizontal plane through the axis of pin 17. Lever member 16 is so constructed that the relationship of point 26 to the heighth of the underside of gauge member 39 is such that when the underside of member 39 is in contact with the surface of sheet under test, indenter point 26 will be in the proper perpendicular position for test. By means of handle 10, supports 8 and 14 are moved toward and away from the working surface and the heighth of the underside of member 39 can be thus adjusted with respect to the working surface for the thickness of the particular material under test.

The above described machine will be used in the following manner. When it is necessary to inspect a quantity of sheets of material of the same thickness, an edge of the material is placed under gauge 39 and the lower surface thereof is brought in contact with the sheet by lowering bracket 14 by means of screw 9. This puts the point in the proper operating position with respect to the sheet of material being tested. Motor 12 then drives eccentric 21 which moves lever 16 by means of follower 20. The motor is geared to drive the eccentric at about the rate of 43 R. P. M. This, in turn, raises and lowers the indenter hardness testing point at the same rate. This rate is determined by the speed with which an operator can place samples of material under the point for testing and remove them after testing. It will be noted that the eccentric is arranged to raise the indenter point from the material and spring 18 supplies the required force on the lever to press the indenter point into the material being tested. The operator times the placing of successive sheets of material to be tested with the raising and lowering of the indenter point. When the point engages a sheet of a predetermined proper hardness, lever 29 actuated by the point moves contact 31 to engage contact 30 thus operating a relay, to operate the solenoid. Plunger 5 moves downwardly and stamp 7 certifies that the material is of a predetermined proper hardness and identifies the inspector. If the point engages a material which is not heat treated to the proper hardness, the contacts 30 and 31 will not close the stamp-actuating circuit.

The unit shown in Figure 3 can readily be removed from the clamp 22 for repairing a broken indenter point. Switch contact 31 can be adjusted on member 32 to vary the spacing of the contacts to correspond with the relative motion of the indenter point and the reading of hardness desired on dial 25.

The impact of the stamp may be adjusted by adjusting the position of the soft iron armature within the solenoid near the center to lighten the impact.

Variations in thickness of material as pointed out above, are accounted for by raising or lowering the pivot point to maintain it coplanar with the surface of the sheet being tested. If an indenter point should be broken, it will give a false reading but a less hard reading, so that there is no danger of the machine certifying a material as satisfactory, due to a broken point.

It is to be understood that certain changes, alterations, modifications and substitutions can be made without departing from the spirit and scope of the appended claims.

I claim as my invention:

1. A machine for testing and certifying the hardness of sheet material, comprising a base member, a lever member pivoted for movement relative to said base member, said pivot being adjustable to a height above said base member equal to the thickness of the sheet of the material being tested, an indenter-point mounted on one end of said lever member, means to move the end of said lever carrying said indenter-point toward said base member at timed intervals, to engage the sheet of material, and means positioned adjacent said indenter-point and actuated thereby, to mark the sheets of material above a predetermined degree of hardness, while leaving unmarked those sheets of lesser degree than the predetermined hardness.

2. In a device of the class described, a material hardness tester comprising an indenter-point, a switch mechanism actuated by said indenter-point, said switch mechanism having contacts that close an electric circuit when said indenter-point engages a material above a predetermined degree of hardness, an electrically operated approval stamping mechanism in said circuit adjacent said indenter-point, whereby, when a material above a predetermined degree of hardness is engaged by said indenter-point, the material will be stamped.

3. A material hardness testing and certifying device comprising an indenter-point, a switch contact actuated by said indenter-point, said switch adapted to close an electric circuit above a predetermined metal hardness, an electrically operated stamping device actuated by the closing of said switch, whereby said indenter-point will close said switch and actuate said stamping device to mark a metal sample under test if the sample is above the proper degree of hardness.

4. A tool for certifying the proper heat treatment of a material sample comprising means for measuring the relative hardness of a sample, a switch mechanism actuated by said means and adapted to be closed when the hardness of the sample is above a predetermined amount, a solenoid-operated stamping means, said switch being operatively connected in the circuit of said solenoid whereby, when the material is above a predetermined degree of hardness, said stamping means will so mark the material sample.

5. In a machine for testing the hardness of sheets of material of various thicknesses comprising a base member, a lever member pivoted for continuous oscillatory movement relative to said base member, motor means to oscillate said lever, a hardness testing indenter-point mounted on one end of said lever in such a position that said point is normal to said base member at the end of the oscillation of said lever when the indenter point is in the operative position, means to adjust the axis of the pivot of said lever relative to said base to maintain the normal relationship between said base member and said point in the operative position at the end of the oscillatory movement for any thickness of material.

6. A machine for testing and certifying the hardness of sheet material, comprising a base member, a lever member pivoted for movement relative to said base member, said pivot being adjustable to a height above said base member equal to the thickness of the sheet of the material being tested, an indenter-point mounted on one end of said lever member, a motor driven cam-actuated mechanism to move said indenter-point toward said base member at timed intervals, to engage successive sheets of material, and a stamping device positioned adjacent said indenter-point and actuated thereby, to mark sheets of material above a predetermined degree of hardness, while leaving unmarked those sheets of less than predetermined degree of hardness.

ADOLPH VLCEK, Jr.